(12) United States Patent
Ban et al.

(10) Patent No.: US 7,957,580 B2
(45) Date of Patent: Jun. 7, 2011

(54) WORKPIECE PICKING DEVICE

(75) Inventors: Kazunori Ban, Yamanashi (JP);
Fumikazu Warashina, Yamanashi (JP);
Keisuke Watanabe, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 1108 days.

(21) Appl. No.: 11/669,477

(22) Filed: Jan. 31, 2007

(65) Prior Publication Data

US 2007/0177790 A1    Aug. 2, 2007

(30) Foreign Application Priority Data

Feb. 1, 2006  (JP) .................................. 2006-024631

(51) Int. Cl.
*G06K 9/00* (2006.01)
(52) U.S. Cl. ........ 382/153; 382/141; 382/143; 382/147; 382/148; 382/152
(58) Field of Classification Search .................. 382/153, 382/141, 143, 147, 148, 152
See application file for complete search history.

(56) References Cited

U.S. PATENT DOCUMENTS

| | | | |
|---|---|---|---|
| 5,319,845 A * | 6/1994 | Watanabe et al. | 29/701 |
| 6,597,971 B2 * | 7/2003 | Kanno | 700/245 |
| 7,474,939 B2 * | 1/2009 | Oda et al. | 700/245 |

FOREIGN PATENT DOCUMENTS

| | | |
|---|---|---|
| EP | 1043642 A2 | 10/2000 |
| EP | 1256860 A2 | 11/2002 |
| EP | 1418025 A2 | 5/2004 |
| EP | 1428634 A2 | 6/2004 |
| JP | 5272922 A | 10/1993 |
| JP | 6-61098 B2 | 8/1994 |
| JP | 2003034430 A | 2/2003 |
| JP | 3421608 B2 | 6/2003 |
| JP | 2004230513 A | 8/2004 |

OTHER PUBLICATIONS

Notice of Reasons for Rejection of Patent Application No. 2006-024631 mailed Nov. 6, 2007.
EP Extended Search Report for EP07001878.3 mailed Jan. 5, 2009.

* cited by examiner

*Primary Examiner* — Mike Rahmjoo
(74) *Attorney, Agent, or Firm* — Lowe Hauptman Ham & Berner LLP

(57) ABSTRACT

A workpiece picking device capable of correctly detecting the size of a workpiece. The picking device has a robot capable of picking the same kind of workpieces contained in a work container, a robot controller for controlling the robot, a video camera positioned above the work container so as to widely image the workpieces and an image processor for processing an image obtained by the video camera. The three-dimensional position and posture of each workpiece is measured by a three-dimensional vision sensor arranged on a wrist element of the robot.

6 Claims, 4 Drawing Sheets

Fig.3

| DETECTION RESULT | N |
| SIZE | --- |
| VERTICAL POSITION | --- |

| DETECTION RESULT | N-1 |
| SIZE | --- |
| VERTICAL POSITION | --- |

| DETECTION RESULT | N-2 |
| SIZE | --- |
| VERTICAL POSITION | --- |

⋮

| DETECTION RESULT | 1 |
| SIZE | --- |
| VERTICAL POSITION | --- |

22d

WORKPIECE PICKING DEVICE

RELATED APPLICATIONS

The present application claims priority from Japanese Patent Application No. 2006-24631, filed on Feb. 1, 2006, the entire content of which is fully incorporated herein by reference.

BACKGROUND OF THE INVENTION

1. Field of the Invention

The present invention relates to a picking device for a workpiece by using a robot, in particular a picking device in which a condition for detecting an object when the object is detected by a vision sensor is utilized.

2. Description of the Related Art

In an application for picking an object or a workpiece from "a random pile", in which a plurality of workpieces are not orderly positioned on a pallet or the like, but are disorderly stacked in a box or the like, a camera is used for widely imaging the workpieces, in order to roughly find the position of a workpiece to be picked. At this point, a detection function or a detection tool for detecting a workpiece in an image, using an image model of the workpiece, has a threshold of the size of the image of the workpiece based on a reference size of the workpiece. The detection tool detects the workpiece, the size of which is within the threshold. In the application for picking the workpiece from the random pile, in relation to the size of the image of the workpiece, there is a considerable difference between workpieces positioned at higher and lower limit positions in an area where the workpieces may exist. Therefore, the size of the image of the workpiece to be detected must have a certain range such that both workpieces positioned at higher and lower positions may be detected.

However, according to the above method, the size of the workpiece may be incorrectly detected. For example, in relation to a brake disc which is imaged as a member having some concentric circles, in pattern matching using an image model constituted by some concentric circles, the size of the model may be incorrectly detected when the difference between the sizes of the workpieces at the higher and lower limit positions is relatively large. Further, in pattern matching, as well as the workpiece detected as the concentric circles, the size may be incorrectly detected for another reason. For example, an image constituted by combining parts of a plurality of workpieces may be detected as one workpiece, depending on the stacking state of the workpieces.

In the application for picking the workpiece from the random pile, a method for determining the detection position of a vision sensor for measuring the three-dimensional position and orientation of an object is possible. In this method, an image of a workpiece positioned at a reference position is taught as "a reference size 100%". Then, after the image is detected by a wide angle camera at a reference size of 100%, a reference detection position for a three-dimensional vision sensor is taught such that the sensor is moved and positioned at a certain distance from the workpiece. Due to this, based on information regarding the size of the workpiece at an arbitrary vertical position detected by the camera, the position of the sensor is determined such that the sensor is away from the workpiece at an arbitrary vertical position at a certain distance. However, according to this method, if the size of the workpiece is incorrectly detected, to a large extent, the vision sensor may be moved to an unsuitable position.

As a known technique for obtaining correct information regarding the three-dimensional position of a workpiece, as described in Japanese Patent Publication No. 6-61098, for example, a stereo visual device, capable of imaging an object from different points, and then detecting the position of the object by distance, based on the disparity, is used.

In a stereo measuring method as described in Japanese Patent Publication No. 6-61098, some images or vertical and horizontal edge lines obtained by imaging the object from difference points are verified, and then, reliable information regarding a cross-section of the object may be obtained. However, when the object or the workpiece is the brake disc, etc., which is relatively easy to be incorrectly detected, no workpiece may be determined to be picked if the verification of the images has failed. Further, when the verification of a workpiece located at the higher position (i.e., the workpiece is easy to be picked) fails, the picking device is directed to pick another workpiece located at the lower position. As a result, the picking device may interfere with other workpieces or external equipment, and/or, the picking device cannot pick the target workpiece due to an obstacle or another workpiece.

In order to reduce the incorrect detection of the size of the workpiece, a method using a plurality of detecting tools is possible. In this method, each detecting tool has a divided threshold calculated by dividing the range of a threshold of the size of the workpiece required for detecting all workpieces. Then, the detecting tools are appropriately switched to be used and the target workpiece is detected by means of images of the workpiece. Also in this case, however, incorrect detection may occur if the switching operation of the detection tools is not suitably carried out.

As another known method for avoiding the incorrect detection of the size of the workpiece by using information regarding the vertical position of the workpiece, a slit light scanning method for scanning a laser slit light in order to measure the vertical position of the workpiece may be possible. However, as this method uses the slit light for scanning an area where the workpiece may exist, the method is considerably disadvantageous in terms of cycle time. Further, the calculation time may increase when the method uses a detecting means for obtaining positional information of the workpiece.

SUMMARY OF THE INVENTION

Accordingly, it is an object of the present invention to provide a workpiece picking device capable of correctly detecting the size of the workpiece so as to solve the above problems.

To this end, according to the present invention, there is provided a workpiece picking device for picking a workpiece by means of a robot, using an image including the same kind of workpieces, comprising: an imaging means for imaging a plurality of workpieces; a detecting part for detecting one or more workpieces in the image, based on the feature of the workpiece predetermined by using the imaging means; a selecting part for selecting one workpiece to be picked from the workpieces detected by the detecting part; a robot for picking the workpiece selected by the selecting part; a detection result storing part for storing a detection result by the detecting part in relation to the workpiece picked by the robot; and a condition setting part for setting a condition in relation to the next detection by the detecting part, using the detection result stored in the detection result storing part.

Concretely, the detection result stored in the detection result storing part is a detection result in relation to a workpiece, which is the latest picked workpiece.

Otherwise, the detection result stored in the detection result storing part may be a detection result in relation to a predetermined number of workpieces, which are counted from the latest picked workpiece.

The detection result stored in the detection result storing part may be information in relation to the size of an image of the workpiece imaged by the imaging means. In this case, the condition setting part may be configured to limit the size of the workpiece to be detected in the next detection by the detecting part within a range that is calculated by adding a certain margin to the size stored in the storing part.

Otherwise, the detection result stored in the detection result storing part may be information in relation to the vertical position of the workpiece. In this case, the condition setting part may be configured to limit the size of the workpiece to be detected in the next detection by the detecting part within a range that is calculated by adding a certain margin to a value representing the size of the workpiece obtained by converting the vertical position of the workpiece stored in the storing part.

BRIEF DESCRIPTION OF THE DRAWINGS

The above and other objects, features and advantages of the present invention will be made more apparent by the following description, of the preferred embodiments thereof, with reference to the accompanying drawings wherein:

FIG. 3 is a diagram showing an illustrative pattern of a detection result of the workpiece;

DETAILED DESCRIPTIONS

Figure 1:
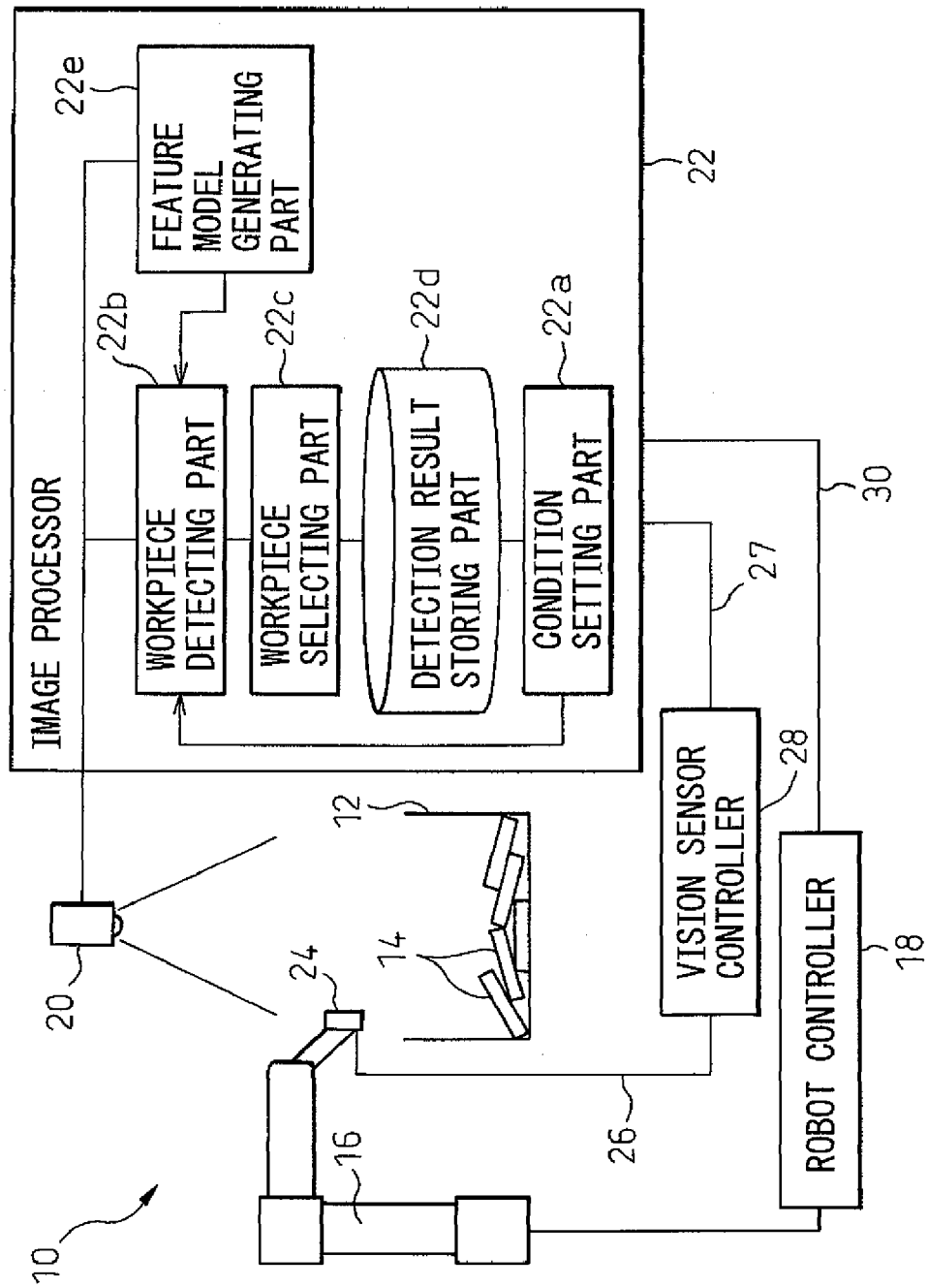
FIG. 1 shows a schematic configuration of a workpiece picking device according to the invention.

The present invention will be described below with reference to the drawings. FIG. 1 shows a total configuration of a workpiece picking device 10 according to a preferred embodiment of the invention. The picking device 10 has a robot 16 capable of picking an object or the same kind of workpieces 14 contained in a work container 12, a robot controller 18 for controlling the robot 16, an imaging means or a video camera 20 positioned above the work container 12 so as to widely image the workpieces 14 (for example, the whole of the work container 12 is within the range of the video camera 20), and an image processor 22 for processing an image obtained by the video camera 20.

Each workpiece 14 is measured by a vision sensor 24 arranged on a wrist element of the robot 16. The vision sensor 24 is, for example, a laser-projection type three-dimensional vision sensor, controlled by a vision sensor controller 28 connected to the sensor via a communication line 26. By connecting the vision sensor controller 28 to the image processor 22 via a communication line 27, the three-dimensional position and the orientation of the specified workpiece 14 may be calculated in detail.

The robot controller 18 is connected to the image processor 22 via a communication line 30. Therefore, a result obtained by imaging and processing using the video camera 20 and the image processor 22 may be utilized to control the robot 16 so as to handle (or a series of operation including approaching, gripping and picking) the workpiece 14. The robot controller 18 may be a known-type having a CPU, a data memory, a frame memory, an image processor and an interface. Therefore, the detailed explanation of the robot controller 18 is omitted.

Next, the function of the image processor 22 is explained. Similarly to the robot controller 18, the image processor 22 also has a CPU, a data memory, a frame memory, an image processor and an interface. The explanation of such elements, having no direct relation to the invention, is omitted.

As shown in FIG. 1, the image processor 22 includes a condition setting part 22a for setting condition regarding the detection of the workpiece, a workpiece detecting part 22b configured to receive image data from the camera 20 and detect one or more workpieces from the data, a workpiece selecting part 22c for selecting one workpiece, to be picked by the robot 16, from the workpieces detected by the workpiece detecting part 22b, a detection result storing part 22d for storing the detection result obtained by the workpiece detecting part 22b. In addition, a workpiece feature model generating part 22e, for executing pattern matching using the image data, is associated with the detecting part 22b. The model generating part 22e generates a feature model including the feature such as an edge of a workpiece positioned at a suitable reference position (for example, the center of the bottom of the container 12) and/or the higher and lower limit sizes of the detected workpiece. Hereinafter, the term "size" or "sizes" does not mean the size of a workpiece itself, but means the size of an image (or a detected size) of the workpiece in the image data or a camera image.

Figure 2:
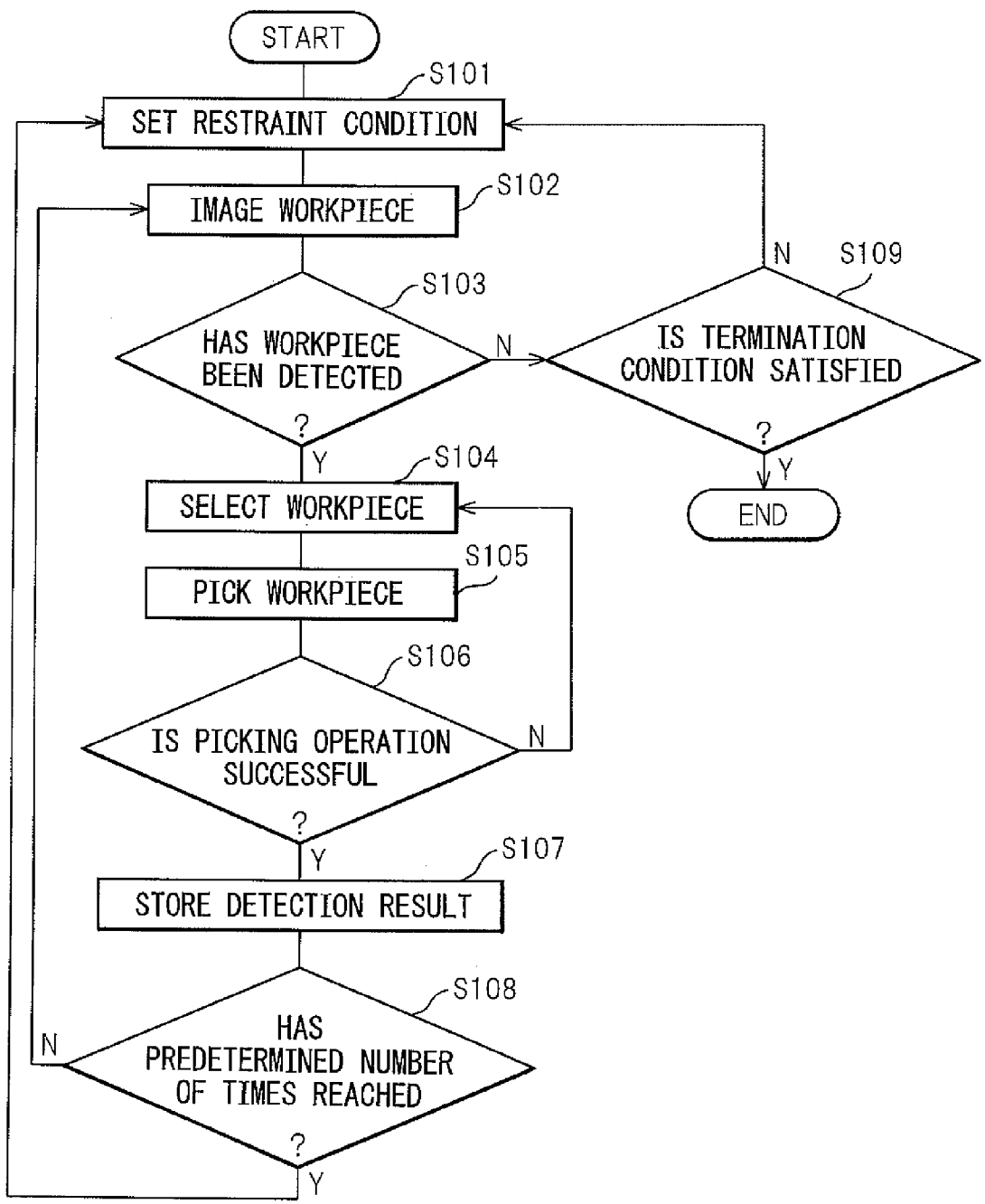
FIG. 2 is a flowchart showing a procedure of an operation for picking a workpiece.

FIG. 2 is a flowchart showing a procedure of an operation using the picking device of FIG. 1. First, in step S101, a restraint condition is set by using the condition setting part 22a of the image processor 22. The restraint condition will be explained below. Then, in step S102, the video camera 20 widely images the workpieces 14. In the next step S103, the workpiece detecting part 22b as described above, judges whether at least one workpiece satisfies the restraint condition (i.e., the workpiece can be picked). If yes, the procedure progresses to step S104.

In step S104, the workpiece selecting part 22c selects a workpiece to be picked by the robot 16 from the workpieces detected by the detecting part 22b. Normally, one workpiece positioned at the highest position (or having the largest size) among the detected workpiece is selected. After that, the robot controller 18 controls the robot 16 to pick the selected workpiece (step S105). At this point, the picking operation by the robot includes calculating the movement position of the vision sensor 24, measuring the three-dimensional position and orientation of the selected workpiece by means of the vision sensor 24, and gripping the workpiece by means of the robot 16.

In the next step S106, it is judged whether the picking operation by the robot 16 is successful or not. If the picking operation fails, the procedure returns to step S104 so as to again select the workpiece to be picked. Otherwise, the procedure progresses to step S107 so as to store the detection result of the picked workpiece in the storing part 22d. At this point, as shown in FIG. 3, the detection result includes information in relation to the size and the vertical position of the workpiece picked in each picking operation. In this way, data of the size and the vertical position of the workpiece picked in each operation is sequentially stored in the storing part.

In step S108, after step S107, it is judged whether the storing operation of the detection result is executed a predetermined number of times. If the predetermined number is not reached, the procedure returns to step S102. Otherwise, the procedure returns to step S101 so as to redefine the restraint condition for the next picking operation.

When no workpiece to be picked is detected in step S103, the procedure progresses to step S109 so as to judge whether a predetermined termination condition is satisfied. If not, the procedure returns to step S101 so as to redefine the restraint condition or otherwise, the procedure is terminated.

Figure 4:
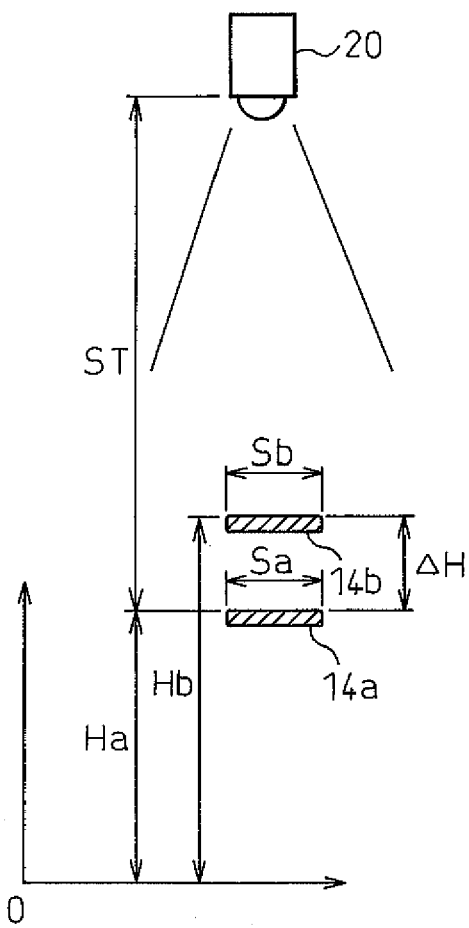
FIG. 4 is a schematic diagram showing the positional relation between the workpiece and a video camera.

Hereinafter, the restraint condition in relation to step S101 is explained. First, as shown in FIG. 4, a workpiece 14a, positioned at a reference position having the height Ha from the origin O, is imaged. At this point, the feature model described above is generated and the detected size Sa of the workpiece is stored. Preferably, this operation is previously carried out before the series of picking operations. Next, the height or the vertical position Hb (Hb=Ha+ΔH) of the latest picked workpiece 14b and the size Sb of the workpiece 14b at the height Hb are stored in the storing part 22d. The following procedure may be classified broadly into two cases, i.e., the procedure uses information regarding the vertical position or the size of the workpiece, as the restraint condition. Hereinafter, each case is explained.

In case that information regarding the vertical position of the workpiece is used as the restraint condition, the height Hb of the latest picked workpiece 14b stored in the storing part 22d is used as the height of a workpiece to be detected in the next picking operation. At this point, the height of the workpiece to be detected is calculated by adding a certain margin to the height Hb. In other words, the calculated height has higher and lower limit values. The margin is determined based on the distance between the video camera 20 and the workpiece 14a at the reference point (a distance ST in FIG. 4). For example, the distance ST is between 1.5 m and 2 m, and the margin is between 5% and 10% of the distance ST.

Figure 5:
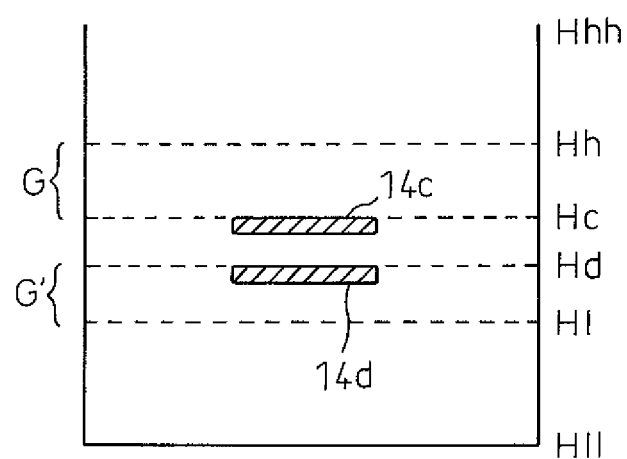
FIG. 5 is a diagram explaining a setting method of the condition in relation to the detection of the workpiece.

FIG. 5 shows an example of the range of detection of the height of the workpiece as the restraint condition. Among the workpieces detected in step S103 of FIG. 2, workpieces 14c and 14d positioned at the highest and the lowest positions are specified. A higher limit value Hh of the height is defined by adding a margin G to the height Hc of the workpiece 14c, and a lower limit value Hl of the height is defined by subtracting a margin G' from the height Hd of the workpiece 14d. In this case, the range of the height between Hl and Hh is the restraint condition (or the range of the height of the workpiece to be detected) for the next picking operation. The margins G and G' may be the same or different. Otherwise, the detection range may be determined by adding to and subtracting from the height of one workpiece (for example, the height Hb of the latest picked workpiece 14b).

In detecting a workpiece by means of the detecting part 22a of the image processor 22, it is necessary to determine the range of the size of the workpiece to be detected, as the restraint condition regarding the detection. According to the above procedure, the range of the height of the workpiece to be detected may be calculated by using information regarding the height of the workpiece. Therefore, the restraint condition may be obtained by converting the range of the height into the range of the size. Concretely, the size of the workpiece imaged by the video camera 20 is inversely proportional to the distance between the video camera 20 and the workpiece. Therefore, with reference to FIG. 4, the restraint condition of the height of the workpiece (ST−ΔH, in this case) may be converted into the size of the workpiece (Sb, in this case), using the equation below:

$$Sb=Sa \cdot ST/(ST-\Delta H)$$

Information regarding the height of the workpiece may also be obtained by using the known stereo visual device described above. However, in the device, it is necessary to verify the detection results or images obtained by imaging the workpiece from different visual points. In the invention, on the other hand, the restraint condition is determined using information of the latest picked workpiece. Accordingly, it is easy to prevent a workpiece, the height of which is very different from the height of the latest picked workpiece, being selected as an object to be picked.

In addition, high-higher and low-lower limit values Hhh and Hll regarding the vertical position of the workpiece may be predetermined based on the largest and smallest sizes of the workpiece which are detectable from the image. When the higher limit value Hh exceeds the high-higher limit value Hhh or when the lower limit value Hl is below the low-lower limit value Hll, the value Hhh or Hll may be used instead of the value Hh or Hl.

In the above case, the detection range is calculated by adding the margin to the vertical position of only the latest picked workpiece. However, it is possible to set the detection range by using information regarding the vertical positions of a plurality of workpieces which are counted from the latest workpiece (i.e., the workpieces are picked in a predetermined number of picking operations). Concretely, from information regarding the height or the vertical position of the workpiece picked in each picking operation, as shown in FIG. 3, data of the predetermined number of picking operations counted from the latest picking operation (the detection result N in FIG. 3) is used. For example, if the predetermined number is three, the information included in the detection results N, N−1 and N−2 is used. In this case, the detection range may be calculated by adding the above margin to a simple average of three data of the height of the workpiece, or, a weighted average in which the latest data is most weighted.

On the other hand, when the size information of the workpiece is used as a restraint condition, similarly to the above case using the height or the vertical position of the workpiece, the size Sb of the latest picked workpiece 14b (FIG. 4) or the simple average or the weighted average of the predetermined number of picked workpieces counted from the latest workpiece is calculated as the size of the workpiece to be picked in the next picking operation. At this point, the size of the workpiece to be picked is determined as a range of value, having upper and lower limit values, by adding a suitable margin to the calculated size.

If the workpiece 14b cannot be picked for some reason, both of the size Sb of the workpiece 14b and the size Sc of another workpiece which is determined to be picked instead of the workpiece 14b may be used as the size of the workpiece to be picked in the next picking operation. For example, so long as the workpiece 14b is detected, the size of the workpiece to be picked in the next picking operation is within a range having an upper limit value obtained by adding a margin to the size Sb and a lower limit value obtained by adding a margin to the size Sc. As described above, the size Sc may be calculated as the simple or weighted average of the sizes of the workpieces picked in the predetermined number of picking operations counted from the latest picking operation.

In the invention, in order to calculate the detection range of the workpiece to be picked, it can be suitably determined, based on various factors such as the shape of the workpiece and/or the state of a pile of the workpieces, whether only information of the vertical position of the latest picked workpiece or information of the vertical positions of the predetermined number of picked workpieces counted from the latest picked workpiece is used, and whether the height information or the size information of the workpiece is used. For example, the size information may be used when size data detected from an image is sufficiently reliable. Contrarily, when the size information is unreliable and height data obtained by the three-dimensional sensor 24 is relatively reliable, the height information may be used.

There are several ways for determining which part of a workpiece should be detected as the size of the workpiece. For example, one preferable way uses a dimension of the workpiece, as the size of the workpiece, which does not vary in an image even when the workpiece is tilted from a reference orientation at a reference point. In other words, the dimension is along the tilting axis of the workpiece. In such a way, detection with high accuracy may be achieved without compensating the image even when the workpiece is tilted.

According to the picking device of the present invention, the detected result of the image of the picked workpiece and/or the height information of the workpiece are stored and used in feedback for the next picking operation. Therefore, the workpiece to be picked in the next picking operation may be correctly detected, whereby picking efficiency may be improved.

The detection may be more reliable, either when the detection result of the latest picked workpiece is used or when the detection result of the predetermined number of workpieces counted from the latest workpiece is used.

By specifying the size of the image of the workpiece as the detection result, a workpiece the size of which is quite different from the size of the latest picked workpiece cannot be detected. Therefore, incorrect detection may be avoided.

By specifying the height or the vertical position of the workpiece just before picking as the detection result, a workpiece the height of which is quite different from the height of the latest picked workpiece can be eliminated from a candidate to be picked.

The size and the height of the workpiece are easily converted to each other by using a simple equation. Therefore, a reasonable restraint condition may be set by using the size and/or the height of the workpiece.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. A workpiece picking device for picking a workpiece by means of a robot, using an image of workpieces of the same kind, said device comprising:
    an imaging part for capturing an image of a plurality of workpieces;
    a detecting part for detecting one or more workpieces in the image;
    a selecting part for selecting one workpiece to be picked from the workpieces detected by the detecting part;
    a robot for picking the workpiece selected by the selecting part;
    a detection result storing part for storing a detection result outputted by the detecting part in relation to the workpiece picked by the robot; and
    a condition setting part for, using the detection result stored in the detection result storing part, setting a condition in relation to a next detection by the detecting part;
    wherein
    the detection result stored in the detection result storing part is the size of the picked workpiece on the image captured by the imaging part, and
    the condition setting part is configured to limit the size of a workpiece to be detected in the next detection by the detecting part within a range that is calculated by adding a certain margin to the size stored in the storing part.

2. The workpiece picking device according to claim 1, wherein the detection result stored in the detection result storing part is in relation to the latest picked workpiece.

3. The workpiece picking device according to claim 1, wherein the detection result stored in the detection result storing part is in relation to the latest picked workpiece and a predetermined number of workpieces which have been picked before the latest picked workpiece.

4. A workpiece picking device for picking a workpiece by means of a robot, using an image of workpieces of the same kind, said device comprising:
    an imaging part for capturing an image of a plurality of workpieces;
    a detecting part for detecting one or more workpieces in the image;
    a selecting part for selecting one workpiece to be picked from the workpieces detected by the detecting part;
    a robot for picking the workpiece selected by the selecting part;
    a detection result storing part for storing a detection result outputted by the detecting part in relation to the workpiece picked by the robot; and
    a condition setting part for, using the detection result stored in the detection result storing part, setting a condition in relation to a next detection by the detecting part;
    wherein
    the detection result stored in the detection result storing part is information in relation to a vertical position of the picked workpiece, and
    the condition setting part is configured to limit the size of a workpiece to be detected in the next detection by the detecting part within a range that is calculated by adding a certain margin to a value representing the size of the picked workpiece on the image captured by the imaging part, said value being obtained by converting the vertical position of the picked workpiece stored in the detection result storing part.

5. The workpiece picking device according to claim 4, wherein the detection result stored in the detection result storing part is in relation to the latest picked workpiece.

6. The workpiece picking device according to claim 4, wherein the detection result stored in the detection result storing part is in relation to the latest picked workpiece and a predetermined number of workpieces which have been picked before the latest picked workpiece.

* * * * *